United States Patent
Yang et al.

(10) Patent No.: US 11,390,784 B2
(45) Date of Patent: Jul. 19, 2022

(54) ECO-FRIENDLY SNOW REMOVAL COMPOSITION COMPRISING POROUS STRUCTURE FROM STARFISH

(71) Applicant: STARS TECH CO., LTD, Seoul (KR)

(72) Inventors: Seung Chan Yang, Seoul (KR); Seon Hwa Kang, Ansan-si (KR)

(73) Assignee: STARS TECH CO., LTD, Seoul (KR)

( * ) Notice: Subject to any disclaimer, the term of this patent is extended or adjusted under 35 U.S.C. 154(b) by 640 days.

(21) Appl. No.: 16/073,337
(22) PCT Filed: May 8, 2018
(86) PCT No.: PCT/KR2018/005272
§ 371 (c)(1),
(2) Date: Jul. 26, 2018
(87) PCT Pub. No.: WO2019/035533
PCT Pub. Date: Feb. 21, 2019

(65) Prior Publication Data
US 2020/0392386 A1 Dec. 17, 2020

(30) Foreign Application Priority Data
Aug. 17, 2017 (KR) .......................... 10-2017-0104021
Jan. 23, 2018 (KR) .......................... 10-2018-0008069

(51) Int. Cl.
*C09K 3/18* (2006.01)
(52) U.S. Cl.
CPC ................ *C09K 3/185* (2013.01); *C09K 3/18* (2013.01)
(58) Field of Classification Search
CPC .................................... C09K 3/185; C09K 3/18
See application file for complete search history.

(56) References Cited

U.S. PATENT DOCUMENTS 5,599,475 A 2/1997 Ossian et al.
6,800,217 B2 * 10/2004 Koefod .................. C09K 3/185
252/70

(Continued)

FOREIGN PATENT DOCUMENTS

JP S60195178 A 10/1985
JP 2010-510344 A 4/2010

(Continued)

OTHER PUBLICATIONS

KR-101694495-B1 machine translation (Year: 2017).*

(Continued)

*Primary Examiner* — Bryan D. Ripa
*Assistant Examiner* — Marites A Guino-O Uzzle
(74) *Attorney, Agent, or Firm* — Novick, Kim & Lee, PLLC; Sang Ho Lee; Hyun Woo Shin

(57) ABSTRACT

Provided is an ecofriendly snow removal composition using a porous structure of calcium carbonate obtained by removing proteins from starfish to adsorb chlorine ions. The ecofriendly snow removal composition uses a starfish-derived porous structure to adsorb the chlorine ions contained in the snow removal composition, so it can minimize the effects of the chlorine ions on the corrosion on roads, facilities, vehicle bodies, etc. to reduce the environmental contamination in roadside trees, rivers, etc. and also display an equivalent deicing performance to the conventional snow removal composition using calcium carbonate. Further, the novel snow removal composition using starfish are ecofriendly and beneficial in the aspect of cost, as it utilizes starfish that are adversely affecting the ecosystem and difficult to dispose of.

5 Claims, 2 Drawing Sheets

(56) References Cited

U.S. PATENT DOCUMENTS

| | | | | |
|---|---|---|---|---|
| 8,182,714 B2 * | 5/2012 | Ossian | ............ | C09K 3/185 252/70 |
| 2008/0315150 A1 * | 12/2008 | Parisi | ............ | C09K 3/185 252/71 |

FOREIGN PATENT DOCUMENTS

| | | | |
|---|---|---|---|
| KR | 10-0706764 | B1 | 4/2007 |
| KR | 10-1176574 | B1 | 8/2012 |
| KR | 10-1405138 | B1 | 6/2014 |
| KR | 10-1694495 | B1 | 1/2017 |
| KR | 101694495 | B1 * | 1/2017 |
| KR | 10-1764694 | B1 | 8/2017 |
| RU | 2265638 | C1 | 12/2005 |
| RU | 2576597 | C1 | 3/2016 |
| WO | 2003/062348 | A1 | 7/2003 |

OTHER PUBLICATIONS

Lim, J.E., Sung, J.K., Sarkar, B. et al. Environ Geochem Health 39, 431-441. DOI: 10.1007/s10653-016-9867 (Year: 2016).*

Kang Sun Hwa, "Chloride Ion Filtering of Desiccant Using Porous Material", The 108th Autumn Meeting of the Korean Chemical Society, Sep. 28, 2011, South Korea. Cited in IDS submitted on Oct. 26, 2018 (Year: 2011).*

Kang Sun Hwa, "Chloride Ion Filtering of Desiccant Using Porous Material", The 108th Autumn Meeting of the Korean Chemical Society, Sep. 28, 2011, South Korea.

Kim Kyung Jun et al. "A Study on the Removal of Salinity of Soil by Adsorption Reaction of Porous Materials", National Science Exhibition, 2013, p. 1-28.

Chosunbiz, "STARs tech Co.,Ltd, a startup company, succeeded in developing an eco-friendly snow removal solution using starfish", Retrieved from the Internet: <URL:http://biz.chosun.com/site/data/html_dir/2017/11/30/2017113001579.html> Posted on Nov. 30, 2017.

* cited by examiner

ECO-FRIENDLY SNOW REMOVAL COMPOSITION COMPRISING POROUS STRUCTURE FROM STARFISH

TECHNICAL FIELD

The present invention relates to an ecofriendly snow removal composition comprising a starfish-derived porous structure, and more particularly to an ecofriendly snow removal composition using a porous structure of calcium carbonate obtained by removing proteins from starfish to adsorb chlorine ions.

BACKGROUND ART

Calcium chloride ($CaCl_2$), used to deice on the road in the winter season, is a chemical compound having a ratio of one calcium ion for two chloride ions, commonly encountered as a solid at room temperature, highly soluble in water and white in color. Highly soluble in water even at low temperatures and able to soak up water contained in air easily, it is also used for the removal of water from a closed space or pure gas.

It is desirable to use calcium chloride in a limited amount to the minimum necessary when there is the difficulty of removing snow in a physical way due to a labor shortage or bad road conditions for snow removal. However, in reality, the situation of urgency or the like leads to the use of calcium chloride more than enough or necessary, so using an excess of calcium chloride leads not only to corrosion on the roads, automobiles, steel structures, etc. but also to saltinization of the soil around the roadside trees to kill the trees and develop the contamination of the soil and ultimately the air.

Namely, calcium chloride alkalizes the soil and then breaks down into chloride ions and a calcium ion, which are absorbed by the root of plants to increase the ion concentration, complexly resulting in leaf yellowing, early defoliation, photosynthesis deterioration, and necrotization of plants. Calcium chloride spread on the roads accelerates the corrosion of iron and steel, more particularly the automobile bodies in winter regions. Further, as the temperature drops, calcium chloride together with water gets frozen to form a slippery layer of ice that obstructs pedestrian or vehicular traffic.

In order to solve the problems with the snow removal materials using calcium chloride as a principal ingredient, many sustained attempts have been made to develop ecofriendly snow removal compositions.

KR Patent No. 10-1176574, for example, discloses an eco-friendly solid-state snow removal composition with reduced potential of metal corrosion that contains, with respect to 100 parts by weight of the composition, 46 to 56 parts by weight of sodium chloride, 15 to 25 parts by weight of calcium chloride, 4 to 6 parts by weight of sodium phosphate, 6 to 10 parts by weight of urea, 5 to 7 parts by weight of sodium acetate, 4 to 6 parts by weight of calcium acetate, and 4 to 6 parts by weight of potassium acetate.

In addition, KR Patent No. 10-1405138 describes an ecofriendly solid-state snow removal composition formed into granules of a predetermined size with low potential of metal corrosion. This snow removal composition is composed of 40.5 to 56 wt. % of calcium chloride, 36 to 51 wt. % of sodium chloride, 3.1 to 7.5 wt. % of sodium citrate, 0.1 to 0.9 wt. % of dibasic calcium phosphate, 0.2 to 2.5 wt. % of sodium acetate, and 0.2 to 2.0 wt. % of urea, and formed into granules having a diameter of 2 to 5 mm.

But, the above-mentioned snow removal compositions still has a considerably high content of calcium chloride, without a solution to the problem related to the potential of corrosion on the road surfaces, automobile bodies, steel structures, etc.

Meanwhile, starfish or sea stars living in intertidal zones are considered as a sea waste and disposed at great expense, annually four to five hundred millions of won. They have a high reproduction rate and high regeneration ability, and make an adverse effect on the ecosystem of sea creatures to reduce the production yields of fish farms. Now that the starfish are merely a trouble to fishermen, there are studies on the methods of utilizing starfish as a resource for other use purposes. Currently, the starfish are dried out and spread on the farmland to raise the crop yield or used as an ingredient in the manufacture of calcium-containing fertilizer and recently as an additive ingredient for cosmetics.

In an attempt to research the methods for effective removal of chlorine ions that cause the problems with the existing snow removal materials, the inventors of the present invention have found out the fact that the use of a starfish-derived porous structure in a snow removal composition is effective in removing chlorine ions, thereby completing the present invention.

DISCLOSURE OF INVENTION

It is an object of the present invention to solve the above-stated problems with the prior art and to provide an ecofriendly snow removal composition capable of adsorbing chlorine ions contained in the snow removal composition using a porous structure obtained by removal of proteins from starfish and thereby solving the problems concerning metal corrosion and environmental contamination caused by the chlorine ions.

In order to achieve the object, the present invention provides an ecofriendly snow removal composition comprising a chloride, a starfish-derived porous structure, and sodium hexametaphosphaste.

In the present invention, the chloride may be at least one selected from the group consisting of calcium chloride ($CaCl_2$), sodium chloride (NaCl), and magnesium chloride ($MgCl_2$).

In the present invention, the starfish-derived porous structure may be obtained by removing proteins from starfish.

The ecofriendly snow removal composition of the present invention may comprise the starfish-derived porous structure in an amount of 0.1 to 1 wt. % with respect to the total weight of the composition, and the sodium hexametaphosphate in an amount of 0.5 to 3 wt. % with respect to the total weight of the composition.

The ecofriendly snow removal composition of the present invention may further comprise a deicing performance disperser, an anticorrosive agent, and a dehumidifying agent.

The present invention also provides a method for preparing an ecofriendly snow removal composition that comprises: (1) a first mixing step of mixing and agitating a chloride and sodium hexametaphosphate; (2) a step of forming the mixture of the first mixing step (1) into particles having an average particle diameter of 0.1 to 13 mm with a granulator; and (3) a second mixing step of mixing the formed particles with a starfish-derived porous structure.

In the present invention, the starfish-derived porous structure may be prepared by a method comprising: washing starfish to remove salts; reacting the starfish with a protease to break down the proteins of the starfish; and obtaining a porous structure from the products of protein degradation.

EFFECTS OF THE INVENTION

The ecofriendly snow removal composition of the present invention uses a starfish-derived porous structure to adsorb the chloride ions contained in the snow removal composition, so it makes a least potential effect on the corrosion of roads, facility structures, automobile bodies, etc., and has the stronger sustaining power for snow removal than the existing snow removal material using potassium chloride and the higher deicing performance than the existing snow removal material using sodium chloride. In addition, the present invention utilizes starfish that adversely affect the ecosystem and become a trouble to dispose of, so it is ecofriendly and beneficial in the aspect of expense and economy.

BEST MODES FOR CARRYING OUT THE INVENTION

Figure 1:
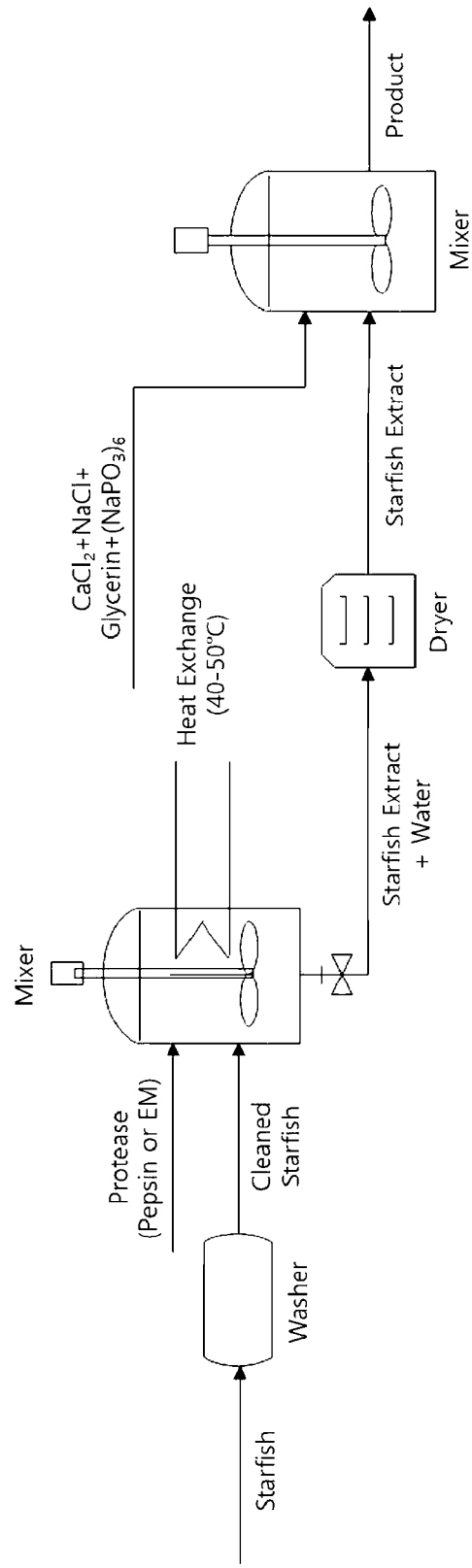
FIG. 1 is a diagram showing the process of preparing the ecofriendly snow removal composition of the present invention.

Hereinafter, a detailed description will be given as to the embodiments of the present invention with reference to the accompanying drawings. The embodiments of the present invention are given merely for the better understanding of the present invention and not construed to limit the scope of the present invention.

The present invention is directed to an ecofriendly snow removal composition containing a chloride and a starfish-derived porous structure.

In the present invention, the term "chloride" means a compound containing chlorine (Cl) as generally used in the art of snow removal materials and may be at least one selected from the group consisting of calcium chloride ($CaCl_2$), sodium chloride (NaCl), and magnesium chloride ($MgCl_2$).

The chloride, functioning as a deicing agent, lowers the freezing point of water and generates heat upon a reaction with water to drop the freezing point of the snow removal composition. Acting as a good snow removal material, the chloride upon in contact with water releases chloride ions ($Cl^-$) and causes the water to break down into a hydrogen ion ($H^+$) and a hydroxide ion ($OH^-$), leading to metal corrosion when in contact with a metal.

The chloride is preferably contained in an amount of 90 to 99.4 wt. % with respect to the total weight of the snow removal composition. When the content of the chloride is less than 90 wt. %, the deicing performance of the snow removal composition is insufficient; while when the content of the chloride is greater than 99.4 wt. %, it is difficult to inhibit the corrosion of metals. It is more preferable to contain the chloride in an amount of 95 to 98 wt. % with respect to the total weight of the snow removal composition in the aspect of the deicing and anticorrosive performances.

The ecofriendly snow removal composition of the present invention provides a solution to the problem concerning the corrosion caused by the chloride by further including the starfish-derived porous structure in addition to the chloride normally used in the existing snow removal materials.

With a high reproduction rate and high regeneration ability, starfish is a living material collectable in large quantities without a separate expense. It is therefore possible to produce the snow removal composition of the present invention in large quantities at low expense, as the snow removal composition contains the porous structure obtained from starfish, which cost low, as an active component.

The porous structure for use in the present invention may be obtained by removing proteins from starfish. The starfish is a living organism composed of proteins and calcium carbonate. A degradation of proteins occurs with the starfish immersed in a 1:1000 to 1:10000 solution of protease, such as pepsin, trypsin, effective microorganisms (EMs), etc., at 45 to 50° C. for 24 to 72 hours, to form a porous structure of calcium carbonate having a higher specific gravity than water as a light yellowish precipitate. The precipitate thus obtained is isolated to yield a three-dimensional porous structure comprised of calcium carbonate.

The starfish-derived porous structure of the present invention is able to adsorb chloride ions presumably by the physical adsorption of water molecular clusters with its three-dimensional pores and the chemical adsorption by the electrical attraction inside the structure.

It is found out that, in one embodiment of the present invention, the snow removal composition containing a starfish-derived porous structure has a deicing performance as high as the conventional snow removal material using calcium chloride and also leads to a considerable reduction of metal corrosion.

The content of the starfish-derived porous structure of the present invention is preferably 0.1 to 1 wt. %, more preferably 0.3 to 1 wt. % with respect to the total weight of the snow removal composition. When the starfish-derived porous structure is contained in an amount less than 0.1 wt. %, the composition has too low adsorption ability for chloride ions to prevent metal corrosion; while when the starfish-derived porous structure is contained in an amount greater than 1 wt. %, the calcium carbonate component of the structure is insoluble in water and the water-insoluble proportion exceeds 1 wt. %, which is above one percent that is the eco-label certification standards. It is therefore preferable to use a large amount of the starfish-derived porous structure as much as possible within the acceptable content range of the water-insoluble portion not exceeding the eco-label certification standards, that is, 1 wt. % for the sake of obtaining a snow removal composition excellent in both the deicing performance and the anti-corrosive performance.

It is also found out that, in one embodiment of the present invention, the snow removal composition having the above-defined content of a starfish-derived porous structure does not only display the equivalent deicing performance to the conventional snow removal composition using calcium carbonate, but also makes the higher anti-corrosive performance.

The ecofriendly snow removal composition of the present invention may further include sodium hexametaphosphate.

The sodium hexametaphosphate (($NaPO_2)_6$) features deliquescence, that is, slowly becoming a thick liquid in the wet air, high solubility, slow melting, and highly hydroscopic properties. The 1% aqueous solution has a pH value of 5.0 to 6.8. The sodium hexametaphosphate is a composition having a ring structure with very strong ion-sequestering power and being used for general food products as a buffer, ion-strength enhancer and cleaning agent.

Sodium hexametaphosphate has the best ability of forming a complex salt with calcium among the phosphates, and its aqueous solution is used as an anticorrosive agent for metals by forming complex ions with $Ca^{2+}$, $Mg^{2+}$, $Ba^{2+}$, $Cu^{2+}$, $Fe^{3+}$, etc. and masking the activity of the ions. According to a conventional method, sodium hexametaphosphate is used in combination with disodium hydrogen phosphate in order to maximize its anticorrosive performance for metal.

It is found out that the present invention in which the sodium hexametaphosphate is in interaction with the starfish-derived porous structure is far superior in the anticorrosive performance for metal to the conventional anticorrosive agents using sodium hexametaphosphate alone or in combination with disodium hydrogen phosphate.

Such an interaction is realized presumably by the sodium hexametaphosphate in the form of an ion forming a coordinate bond to the calcium carbonate porous structure to provide a structured anticorrosive agent, which displays the far stronger anticorrosive performance than the conventional anticorrosive agents.

The content of the sodium hexametaphosphate is preferably 0.5 to 3 wt. %. When the sodium hexametaphosphate is contained in an amount less than 0.5 wt.%, the composition has the difficulty in preventing the metal corrosion caused by sodium chloride, calcium chloride, etc.; while when the sodium hexametaphosphate is contained in an amount greater than 3 wt. %, the water-insoluble proportion exceeds 1% due to the excessive formation of complex salts.

The ecofriendly snow removal composition of the present invention may further include additives, such as an additional anticorrosive agent, a deicing performance disperser, a dehumidifying agent, etc.

The additional anticorrosive agent as used herein may include, if not specifically limited to, a component that is applied on a metal or the like to react with the chloride ions instead of the metal, thereby preventing the corrosion of the metal.

The additional anticorrosive agent is, for example, preferably at least one selected from the group consisting of disodium hydrogen phosphate, calcium oxalate, sodium citrate, and sodium gluconate; more preferably disodium hydrogen phosphate ($Na_2HPO_4$).

The additional anticorrosive agent is preferably contained in an amount of 0.1 to 3 wt. % with respect to the total weight of the composition. When the content of the additional anticorrosive agent is less than 0.1 wt. %, it is impossible to inhibit the metal corrosion caused by calcium chloride and sodium chloride; while when the content of the additional anticorrosive agent is greater than 3 wt. %, precipitation may take place to have the water-insoluble proportion above 1%.

In the present invention, the total weight of the starfish-derived porous structure, the sodium hexametaphosphate, and the additional anticorrosive agent (if used) is preferably 3.5 wt. % or less with respect to the total weight of the composition. When the total weight is greater than 3.5 wt. %, the water-insoluble proportion exceeds 1%, which does not meet the eco-label certification standards.

The deicing performance disperser is added for the purpose of raising the penetration rate of the snow removal material and increasing the penetration depth and the dispersability. Examples of the deicing performance disperser may include any viscous material, such as glycerin, propylene glycol, sorbitol, molasses, etc., preferably glycerin.

The deicing performance disperser is preferably contained in an amount of 0.3 to 3 wt. % with respect to the total weight of the composition. When the content of the deicing performance disperser is less than 0.3 wt. %, it is possible to deteriorate penetration and dispersion performances; while when the content of the deicing performance disperser is greater than 3 wt. %, there is a possibility that the deicing performance disperser remains in the melting solution during the snow-removing operation to cause slipperiness on the road.

If necessary, the ecofriendly snow removal composition of the present invention may further include a known additive, such as, for example, a salt of organic acid. The salt of organic acid salt as used herein is preferably a salt of ascorbic acid, citric acid, acetic acid, propionic acid, gluconic acid, formic acid, etc., most preferably a salt of citric acid. The salt of citric acid as used herein may be sodium citrate or potassium citrate. A citrate is a substance that is slightly acidic, with such a low toxicity as can be used as an additive for foods, and reactive to water to become slightly viscous. It can be used in combination with the above-mentioned disodium hydrogen phosphate rather than alone to display the higher anticorrosive effect. The content of the salt of organic acid is preferably in the range of 0.3 to 3 wt. % with respect to the total weight of the snow removal composition.

Hereinafter, a detailed description will be given as to a method of preparing an ecofriendly snow removal composition according to the present invention. FIG. 1 is a diagram illustrating the process for preparing an ecofriendly snow removal composition of the present invention.

The method for preparing an ecofriendly snow removal composition comprises: (1) a first mixing step of mixing and agitating a chloride and sodium hexametaphosphate; (2) a step of forming the mixture of the first mixing step (1) into particles having an average particle diameter of 0.1 to 13 mm with a granulator; and (3) a second mixing step of mixing the formed particles with a starfish-derived porous structure.

The first mixing step is optionally adding additives, such as an additional anticorrosive agent, a deicing performance disperser, a dehumidifying agent, etc., and mixing them together.

The particle-forming step is forming particles having a uniform particle diameter with a granulator. The average particle diameter of the particles is preferably 0.1 to 13 mm, more preferably 5 to 10 mm, which satisfies the eco-label certification standards for particle size and desirable in the aspects of easiness of application without a release of fine powder, and good workability.

The mixture formed into particles having a uniform particle diameter is mixed with a starfish-derived porous structure to prepare the ecofriendly snow removal composition of the present invention. In this regard, the starfish-derived porous structure may be prepared by a method including: washing starfish to remove salts; reacting the cleaned starfish with a protease to break down the proteins of the starfish; and obtaining a porous structure from the products of protein degradation.

The protease as used herein is any degradation enzyme capable of breaking down the proteins of starfish and may include, if not specifically limited to, pepsin, trypsin, effective microorganisms (EMs), etc. When starfish is in contact with a protease at 45 to 50° C. for 24 to 72 hours, a degradation of proteins takes place to form a porous structure of calcium carbonate having a higher specific gravity than water as a light yellowish precipitate. The precipitate thus obtained is isolated to yield a three-dimensional porous structure comprised of calcium carbonate.

In the preparation method for the ecofriendly snow removal composition of the present invention, the composition of the ingredients, that is, the chloride, the porous structure, the sodium hexametaphosphate, and additives is the same as the detailed contexts described above.

EXAMPLES

Hereinafter, the present invention will be described in further detail with reference to examples. It would be apparent to those skilled in the art that the examples are given merely for the better understanding of the present invention and construed not to limit the scope of the present invention.

Preparation Example 1

Preparation of Starfish-Derived Porous Structure 100 g of starfish was washed, desalted from the surface, and put in a water bath. Then 1.5 L of distilled water was added to the water bath, of which the temperature was set to 50° C. 1.5 g of pepsin (1:10000) as a protease was added, and after 5-minute agitation, the water bath was stood for 3 days.

In 3 days, the floating matters were removed from the water bath and washed with distilled water to obtain a slight yellowish solid, which was then dried out in a dryer at 50° C. to yield a starfish-derived porous structure in the form of slightly yellowish powder.

Figure 2:
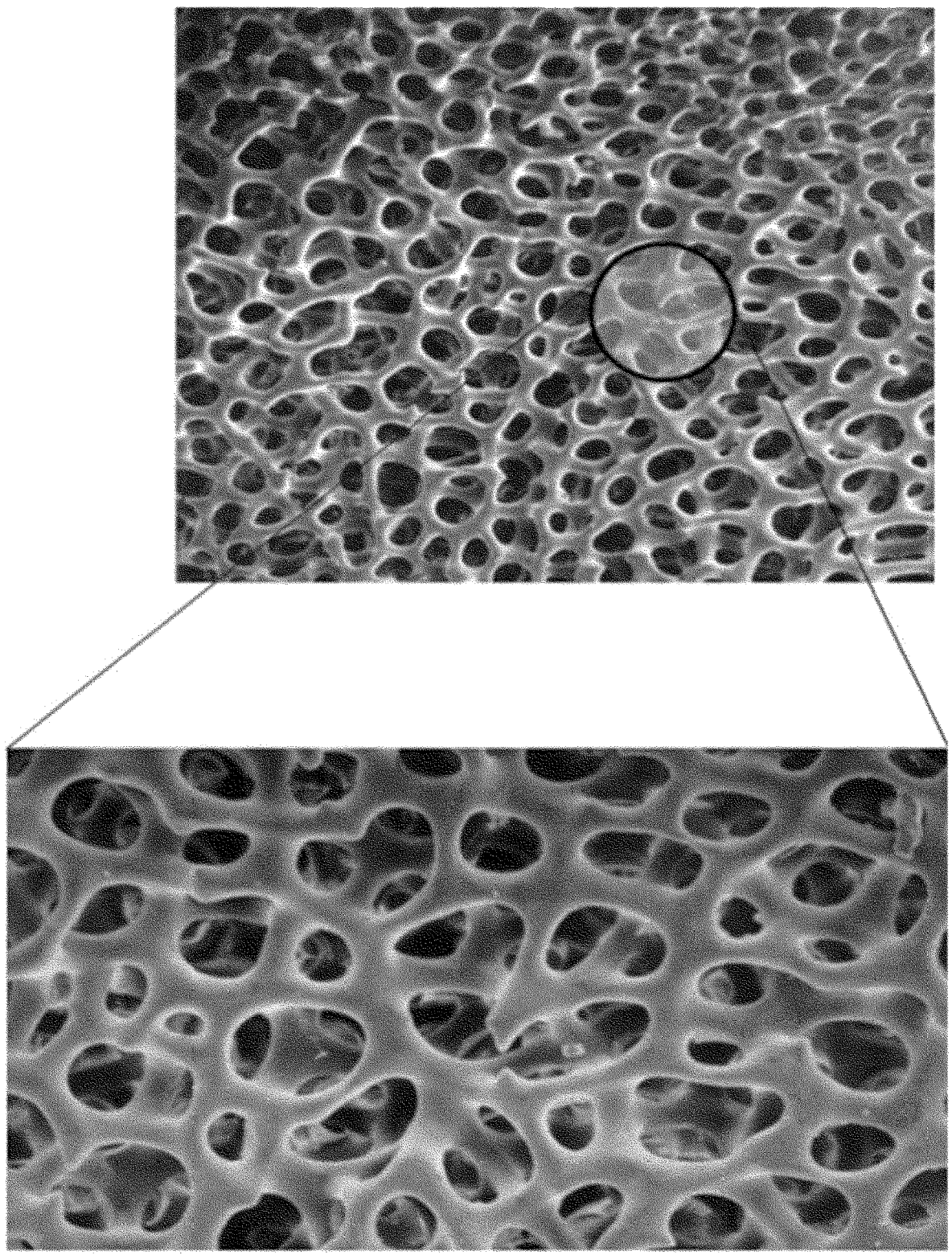
FIG. 2 is a scanning electron emission (SEM) image of a porous structure obtained from starfish.

The scanning electron microscopic (SEM) images of the starfish-derived porous structure thus obtained are presented in FIG. 2. As can be seen from the SEM images obtained at X700 (top) and X20000 (bottom) magnification, the starfish-derived porous structure has porosity in every direction.

Preparation Example 2

Preparation of Ecofriendly Snow Removal Composition

The components of the following Table 1 were mixed together to prepare a solid-state snow removal composition (unit: wt. %).

All the components other than the starfish porous structure were mixed together under agitation, and the resultant mixture was formed into particles having a uniform particle diameter of about 5 to 10 mm with a granulator.

The granulated particles were mixed with the porous structure prepared in the Preparation Example 1 under agitation to prepare an ecofriendly snow removal composition.

In the following Table 1, the Comparative Example 8 is for a comparison to the conventional ecofriendly snow removal composition and the same as the numerals denoted in Example 1 of KR Patent No. 10-1694495.

TABLE 1

|  | $CaCl_2$ | NaCl | Sodium hexametaphosphate | Disodium phosphate | Glycerin | Star fish structure | $CaCO_3$ |
|---|---|---|---|---|---|---|---|
| Example 1 | 33 | 64.4 | 1.5 | — | 1 | 0.1 | — |
| Example 2 | 33 | 64.2 | 1.5 | — | 1 | 0.3 | — |
| Example 3 | 33 | 64 | 1.5 | — | 1 | 0.5 | — |
| Example 4 | 33 | 63.7 | 1.5 | — | 1 | 0.8 | — |
| Example 5 | 33 | 63.5 | 1.5 | — | 1 | 1 | — |
| Example 6 | 33 | 64.5 | 1 | — | 1 | 0.5 | — |
| Example 7 | 33 | 63.5 | 2 | — | 1 | 0.5 | — |
| Example 8 | 33 | 63 | 2.5 | — | 1 | 0.5 | — |
| Example 9 | 33 | 63 | 1 | — | 1 | 0.5 | — |
| Comparative Example 1 | 33 | 65.2 | 0.3 | 1.5 | 1 | 0.5 | — |
| Comparative Example 2 | 33 | 62.2 | 3 | — | 1 | 0.8 | — |
| Comparative Example 3 | 33 | 63.3 | 1.5 | — | 1 | 1.2 | — |
| Comparative Example 4 | 33 | 64 | 1.5 | — | 1 | — | 0.5 |
| Comparative Example 5 | 33 | 63.5 | 1.5 | — | 1 | — | 1 |
| Comparative Example 6 | 33 | 62 | — | 3 | 1 | 1 | — |
| Comparative Example 7 | 33 | 63.5 | 1 | 1.5 | 1 | — | — |
| Comparative Example 8 | 40 | 54 | 3 | 3 | — | — | — |

Experimental Example 1

Measurement of Deicing Performance

The snow removal compositions were measured in terms of the deicing performance according to the standards of the EL:610 deicing performance testing method, EM-502-3.

The individual funnels were fixed to the thermostatic baths at −3° C. and −7° C. An Erlenmeyer flask was positioned under each funnel and placed on a scale set to zero.

An ice cube (3cm×3cm×3cm) was put in the funnel, and 1 g of each snow removal composition of the Preparation Example 2 was spread on the ice cube. Then, the weight of water running down from the melted ice cube along the funnel was measured in 15, 30 and 60 minutes.

The weight measurements are reduced to the percentage (%) with respect to the numerals obtained in Comparative Example 2 and presented in the following Table 2.

TABLE 2

| | Temperature | | | | | |
|---|---|---|---|---|---|---|
| | −3° C. | | | −7° C. | | |
| | Time | | | | | |
| | 15 min | 30 min | 60 min | 15 min | 30 min | 60 min |
| Example 1 | 128 | 131 | 137 | 126 | 129 | 134 |
| Example 5 | 128 | 130 | 125 | 123 | 126 | 127 |
| Example 7 | 126 | 127 | 130 | 130 | 129 | 131 |
| Comparative Example 1 | 125 | 129 | 125 | 131 | 133 | 129 |
| Comparative Example 4 | 121 | 125 | 126 | 134 | 133 | 137 |
| Comparative Example 8 | 105 | 108 | 113 | 104 | 102 | 101 |

As can be seen from Table 2, the ecofriendly snow removal composition of the present invention was, in terms of the deicing performance, equivalent or superior to the Comparative Example 1 using a small amount of an anticorrosive agent and far superior to the Comparative Example 8, a conventional ecofriendly snow removal composition using calcium carbonate in the place of the starfish-derived porous structure.

From the results, it is found out that the ecofriendly snow removal composition of the present invention can prevent the corrosion of metals without a deterioration of the deicing performance.

Experimental Example 2

Testing on Water-Insoluble Proportion and Degree of Metal Corrosion

Experiments were performed to evaluate the snow removal compositions of the Examples and the Comparative Examples in regards to the water-insoluble proportion and the degree of metal corrosion.

As for the water-insoluble proportion, 100 g of a specimen was dissolved in 250 g of distilled water, and the resultant solution was subjected to filtration to determine the weight percentage (wt. %) of the remainder after filtration with respect to the weight of the specimen with reference to the method specified in the KS M ISO 2479:2012.

The degree of metal corrosion was determined according to the testing method specified in the Testing Method Standards, EM502-1.

TABLE 3

| Div. | Water-insoluble proportion (%) | Corrosive loss per NaCl (%) |
|---|---|---|
| Example 1 | 0.57 | 28.8 |
| Example 2 | 0.7 | 12.1 |
| Example 3 | 0.8 | 6.9 |
| Example 4 | 0.98 | 8.6 |
| Example 5 | 0.99 | 7.2 |
| Example 6 | 0.79 | 15.3 |
| Example 7 | 0.85 | 4.6 |
| Example 8 | 0.95 | 3.6 |
| Example 9 | 0.93 | 12.8 |
| Comparative Example 1 | 0.61 | 40.8 |
| Comparative Example 2 | 1.27 | 2.1 |
| Comparative Example 3 | 1.26 | 4.6 |
| Comparative Example 4 | 0.9 | 46.3 |
| Comparative Example 5 | 1.14 | 50.4 |
| Comparative Example 6 | 2.03 | 50.1 |
| Comparative Example 7 | 0.49 | 34.5 |
| Comparative Example 8 | — | 31.05 |

Referring to Table 3, the water-insoluble proportion was gradually increased with an increase in the content of the starfish-derived porous structure (Examples 1 to 5). When the content of the porous structure is greater than 1 wt.% (Comparative Example 3), the water-insoluble proportion exceeds 1%. With the higher content of the porous structure, the corrosive loss was decreasing (Examples 1 to 5 and Comparative Example 3), which implicitly showed that the porous structure made a great effect on the rate of metal corrosion.

Further, when the content of sodium hexametaphosphate with respect to the same content of the porous structure (0.5 wt. %) was changed to 1 wt. %, 1.5 wt. %, 2 wt. %, and 2.5 wt. % (Examples 3, 6, 7 and 8), the rate of metal corrosion was gradually reduced to 15.3%, 6.9%, 4.6%, and 3.6%, respectively.

Particularly, the snow removal composition of the Example 8 using 2.5 wt. % of sodium hexametaphosphate alone as an anticorrosive agent displayed the lowest rate of metal corrosion, 3.6%, which was far lower than the rate of metal corrosion, 12.8%, for the snow removal composition of the Example 9 using 1 wt. % of sodium hexametaphosphate in combination with 1.5 wt. % of disodium hydrogen phosphate as an anticorrosive agent. This implicitly showed that unlike the general anticorrosive agents, sodium hexametaphosphate had a coordinate bond to the porous structure to secure a considerably high anticorrosive performance.

The snow removal composition of the Comparative Example 2 using 0.8 wt. % of a starfish-derived porous structure and 3 wt. % of sodium hexametaphosphate showed the lowest rate of metal corrosion, 2.1%. But the total content of the starfish-derived porous structure and sodium hexametaphosphate was greater than 3.5 wt. %, so the water-insoluble proportion exceeded 1%.

In addition, the snow removal compositions of the Comparative Examples 4 and 5 using the same amount of calcium carbonate in replacement of the starfish extract of the Examples 3 and 5 displayed a rate of metal corrosion 46.3% and 50.4%, respectively. This demonstrated that the snow removal composition of the present invention containing a starfish extract was far superior in the anticorrosive performance for metal to the snow removal composition containing the same amount of calcium carbonate.

The snow removal composition of the Comparative Example 6 containing 1 wt. % of the starfish extract and 3 wt. % of disodium hydrogen phosphate led to the water-insoluble proportion exceeding 1% and displayed the far higher rate of metal corrosion than that of the Example 5 using 1.5 wt. % of sodium hexametaphosphate.

The snow removal composition of the Comparative Example 7 not using the starfish extract showed the far higher rate of metal corrosion, 35.5%, than that of the Example 9 using the same amount of sodium hexametaphosphate and disodium hydrogen phosphate.

The conventional ecofriendly snow removal composition of the Comparative Example 8 had a terribly low deicing performance and a high rate of metal corrosion, 31.05% in the Experimental Example 1.

The present invention has been described with reference to the particular preferred embodiments. The scope of the present invention is not limited to the specific embodiments disclosed as the best modes planned to realize the present invention but includes many changes and modifications made by those skilled in the art without departing from the scope and spirit of the present invention.

What is claimed is:

1. An ecofriendly snow removal composition comprising:
    a chloride;
    a starfish-derived porous structure obtained by removing proteins from starfish; and
    sodium hexametaphosphate,
    wherein the sodium hexametaphosphate in the form of an ion forms a coordinate bond to the starfish-derived porous structure when the composition is dissolved in water,
    the starfish-derived porous structure is contained in an amount of 0.1 to 1 wt.% with respect to the total weight of the composition, and
    the sodium hexametaphosphate is contained in an amount of 0.5 to 3 wt.% with respect to the total weight of the composition.

2. The ecofriendly snow removal composition as claimed in claim 1, wherein the chloride is at least one selected from the group consisting of calcium chloride ($CaCl_2$), sodium chloride (NaCl), and magnesium chloride ($MgCl_2$).

3. The ecofriendly snow removal composition as claimed in claim 1, further comprising a deicing performance disperser, an anticorrosive agent, and a dehumidifying agent.

4. A method for preparing the ecofriendly snow removal composition of claim 1, the method comprising:
    (1) a first mixing step of mixing and agitating the chloride and the sodium hexametaphosphate;
    (2) a step of forming the mixture of the first mixing step (1) into particles having an average particle diameter of 0.1 to 13 mm with a granulator; and
    (3) a second mixing step of mixing the formed particles with the starfish-derived porous structure.

5. The method as claimed in claim 4, wherein the starfish-derived porous structure is prepared by a method comprising:
    washing the starfish to remove salts;
    reacting the washed starfish with a protease to degrade proteins in the starfish; and
    obtaining the starfish-derived porous structure from the products of protein degradation.

* * * * *